(12) United States Patent
Rahi et al.

(10) Patent No.: US 8,306,842 B2
(45) Date of Patent: Nov. 6, 2012

(54) PROJECT PLANNING AND MANAGEMENT

(75) Inventors: M. Ahsan Rahi, Sugar Land, TX (US);
Oscar Mauricio Villegas Bello, Lyons (FR); Andrew Peters, Pyrenees (FR); Victor Lee Ward, Sugar Land, TX (US); Vishwanath Narayanamurthy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 772 days.

(21) Appl. No.: 12/393,228

(22) Filed: Feb. 26, 2009

(65) Prior Publication Data

US 2010/0100409 A1    Apr. 22, 2010

Related U.S. Application Data

(60) Provisional application No. 61/105,959, filed on Oct. 16, 2008.

(51) Int. Cl.
*G06Q 10/00*    (2012.01)

(52) U.S. Cl. ............. 705/7.23; 705/7.16; 705/7.17; 705/7.26; 705/301

(58) Field of Classification Search ................ None
See application file for complete search history.

(56) References Cited

U.S. PATENT DOCUMENTS

| | | | | |
|---|---|---|---|---|
| 5,189,606 A * | 2/1993 | Burns et al. | | 705/7.23 |
| 5,291,397 A * | 3/1994 | Powell | | 700/97 |
| 6,980,940 B1 | 12/2005 | Gurpinar et al. | | |
| 7,117,161 B2 * | 10/2006 | Bruce | | 705/7.26 |
| 7,283,975 B2 * | 10/2007 | Broughton | | 705/28 |
| 7,467,045 B2 | 12/2008 | Tabanou et al. | | |
| 7,539,625 B2 | 5/2009 | Klumpen et al. | | |
| 7,596,416 B1 * | 9/2009 | Maluf et al. | | 700/1 |
| 7,720,703 B1 * | 5/2010 | Broughton | | 705/7.23 |
| 2002/0049621 A1 * | 4/2002 | Bruce | | 705/7 |
| 2003/0050871 A1 * | 3/2003 | Broughton | | 705/28 |
| 2003/0149578 A1 * | 8/2003 | Wong | | 705/1 |
| 2004/0030992 A1 * | 2/2004 | Moisa et al. | | 715/513 |
| 2004/0143477 A1 * | 7/2004 | Wolff | | 705/9 |
| 2006/0044307 A1 * | 3/2006 | Song | | 345/419 |
| 2007/0199721 A1 | 8/2007 | Givens et al. | | |
| 2007/0300174 A1 * | 12/2007 | Macbeth et al. | | 715/772 |
| 2008/0228830 A1 | 9/2008 | Hawtin | | |
| 2008/0300793 A1 | 12/2008 | Tilke et al. | | |
| 2008/0319811 A1 * | 12/2008 | Casey | | 705/7 |
| 2010/0057510 A1 * | 3/2010 | Stevens et al. | | 705/7 |

OTHER PUBLICATIONS

Hemachandra, P.. Simulated Earned Value Management (SEVM) tool for proactive project control. M.Sc. dissertation, University of Calgary (Canada), Canada.*

Guidong Zhu, Jonathan F Bard, & Gang Yu. (2007). A two-stage stochastic programming approach for project planning with uncertain activity durations. Journal of Scheduling, 10(3), 167-180.*

Elhami B Nasr, James Diekmann, & John a Kuprenas. (2000). Total project cost success factors. ASCE International Transactions,C9.1-C9.8.*

Chotchai Charoenngam, & Abdul Samad Kazi. (1997). Cost/schedule information system: A human-centered approach. Cost Engineering, 39(9), 29-35.*

(Continued)

*Primary Examiner* — Gurkanwaljit Singh

(57) ABSTRACT

A tool integrates various components of project planning and management. The tool enables the creation and tracking of authorization for expense (AFE) information for a project. Also, the tool allows risks to be assigned to corresponding activities of the project.

17 Claims, 6 Drawing Sheets

OTHER PUBLICATIONS

Phaobunjong, Kan (2002). Parametric cost estimating model for conceptual cost estimating of building construction projects. Ph.D. dissertation, The University of Texas at Austin, United States—Texas.*

Prasad, R.. (2007). Schedule and Cost Risk Evaluation. AACE International Transactions,RI41-RI45.*

Reigle, Jennifer A. (2000). Development of an integrated project-level pavement management model using risk analysis. Ph.D. dissertation, West Virginia University, United States—West Virginia.*

Elhami B Nasr, James Diekmann, & John A Kuprenas. (2000). Total project cost success factors. AACE International Transactions,C9.1-C9.8.*

* cited by examiner

Task - Risk relationship

PROJECT PLANNING AND MANAGEMENT

CROSS-REFERENCE TO RELATED APPLICATIONS

This application claims priority to the filing date of U.S. Provisional Patent Application Ser. No. 61/105,959, entitled "Project Planning and Management," filed on Oct. 16, 2008 and to U.S. application Ser. No. 12/246,863, entitled "A Project Management System Adapted for Planning and Managing Project," filed Oct. 7, 2008 which is hereby incorporated by reference.

TECHNICAL FIELD

The invention relates generally to project planning and management.

BACKGROUND

A typical project performed by an enterprise (e.g., company, educational organization, government agency, etc.) can include a number of diverse functions performed by different personnel in the organization. For example, in the hydrocarbon-development or production industry, the main functions of a project can involve subterranean surveying (to survey subterranean structures to determine whether the subterranean structures contain hydrocarbon reservoirs), civil engineering (to build infrastructure such as roads), well drilling (to drill one or more wells to enable the production of hydrocarbons), well completion (to install completions equipment into wells to enable production of hydrocarbons), well production (to produce hydrocarbons to the earth surface), and so forth.

Project planning and management for a project that includes multiple functions (and many activities associated with such functions) can be complex. Project planning and management can include the following components: definition of the scope of the project, scheduling, risk analysis, management of human resources, finance, and communications. Conventional project planning and management techniques do not provide efficient integration of the various project planning and management components, which can lead to reduced efficiency and increased costs.

SUMMARY

In general, a tool is provided to integrate various components for planning and managing a project.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
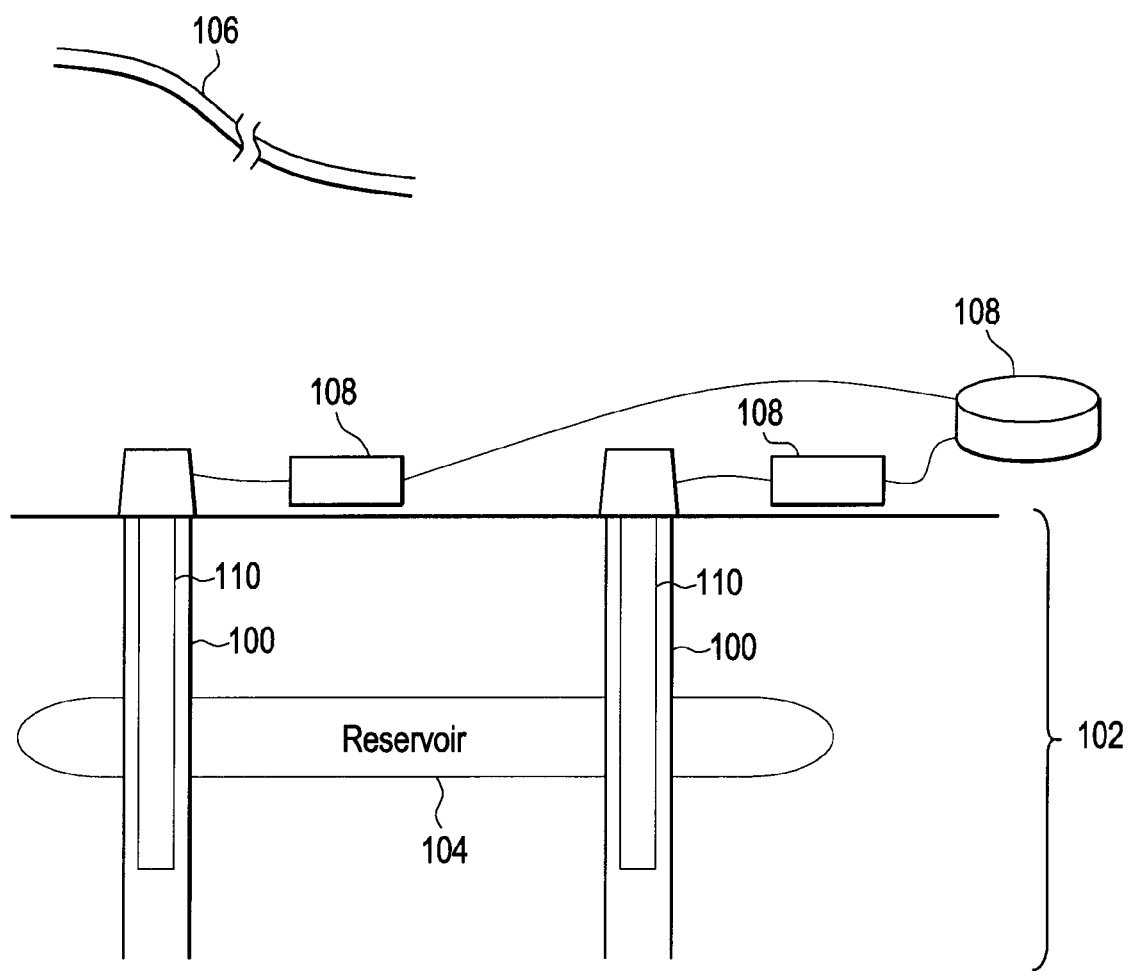
FIG. 1 is a schematic diagram of an exemplary hydrocarbon development and/or production arrangement.

FIG. 1 illustrates an exemplary hydrocarbon producing arrangement that includes wells 100 drilled into a subterranean structure 102. Prior to drilling of the wells 100, a survey (such as an electromagnetic or seismic survey) may have been performed to check whether a hydrocarbon-containing reservoir 104 is in the subterranean structure 102. The surveying of the subterranean structure 102 is performed by a survey team within an organization. Once it is confirmed that the subterranean structure 102 includes the hydrocarbon-containing reservoir 104, a civil engineering team can be asked to build a road 106 and other infrastructure to allow for development of the subterranean structure 102. The road 106 allows drilling and other equipment to be brought to the well sites. A drilling team in the organization then performs drilling of the wells 100.

A completions team in the organization can complete the wells 100 with completion equipment 110 deployed in the respective wells 100, as well as to build up various earth surface production structures 108 (e.g., pipelines, containers, pumps, etc.).

Once the wells 100 have been completed, hydrocarbon production can begin. Production of hydrocarbons can either be performed by the organization that drilled and completed the wells 100, or by a customer of the organization.

The various functions (surveying, civil engineering, drilling, completions, and production) described above make up a project, where the project relates to development to enable production of hydrocarbons. Each function is in turn associated with various activities performed by various personnel of the organization (or by outside contractors).

Although reference is made to projects in the hydrocarbon development and production context, it is noted that techniques and systems according to some embodiments can also be applied to other types of projects in other contexts.

Figure 2:
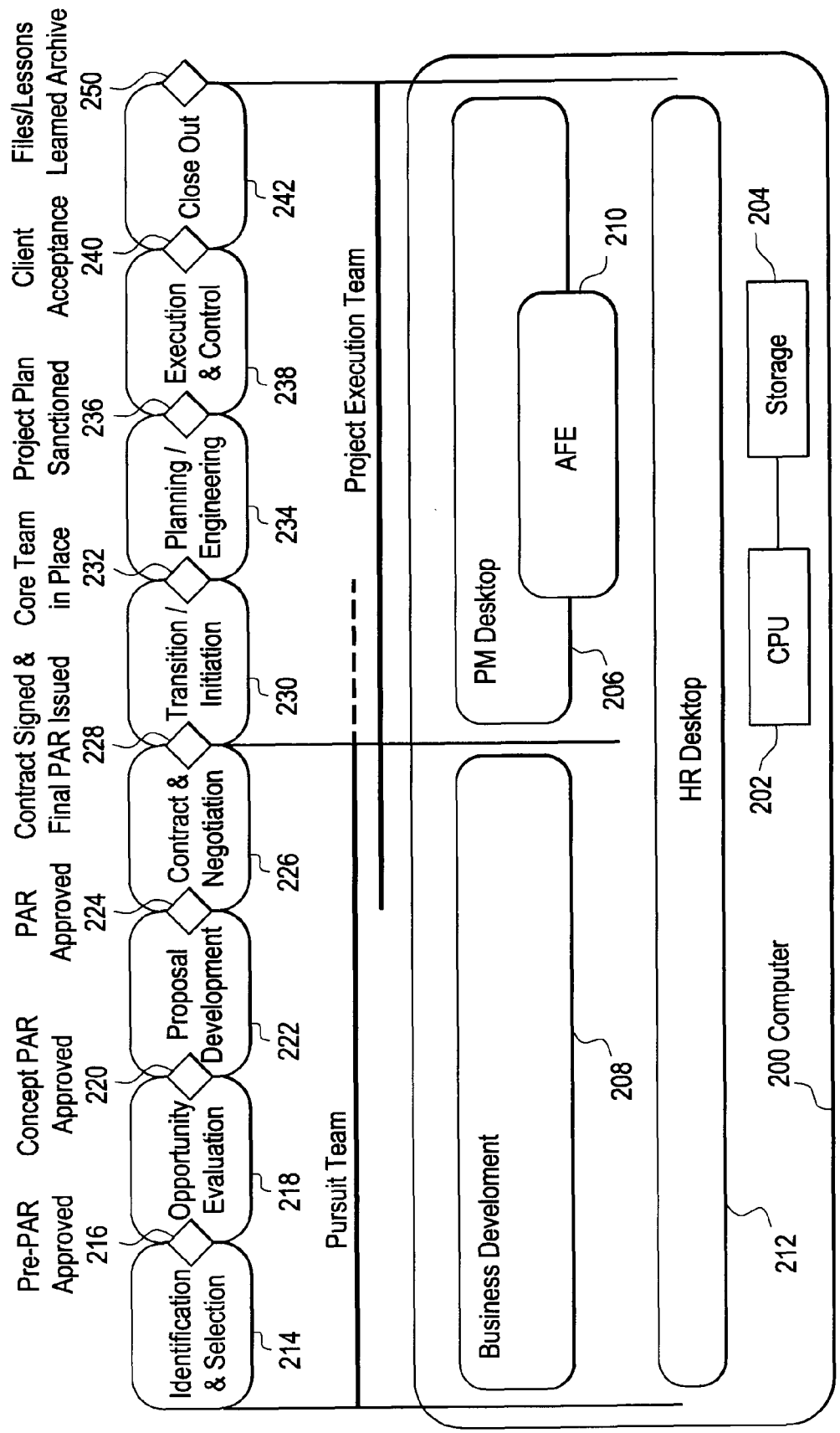
FIG. 2 is a schematic diagram of a system that incorporates a project planning and management tool, according to an embodiment.

FIG. 2 illustrates an exemplary system in which a tool for integrating components of project planning and management according to some embodiments of the invention is incorporated. In the example of FIG. 2, the system includes a computer 200 that has one or more central processing units (CPUs) 202 connected to storage 204. Various software modules are executable on the CPU(s) 202, including a project management desktop module 206, a business development module 208, an AFE (authorization for expenditure) module 210, and a human resources (HR) desktop module 212. Although depicted as various modules, it is noted that one or more of the modules depicted in FIG. 2 can be implemented in the same software module. Moreover, some of the modules depicted in FIG. 2 can be divided into multiple modules.

The system depicted in FIG. 2 incorporates an integrated project planning and management tool (made up of the modules 206, 208, 210, and 212) that integrates various project planning and management components to allow for more efficient project planning and management.

The business development module 208 is a business development tool to enable identification, selection, and development of business opportunities. As depicted in FIG. 2, the tasks that can be performed using the business development module 208 include project identification and selection (214) for identifying and selecting whether a prospective project is something that an enterprise would be interested in pursuing based on understood risks, scope of the project, and amount of resources available at the enterprise. For example, a prospective project may be a project identified by sales personnel of the enterprise, or alternatively, a customer may have approached the enterprise to provide a bid for the project. As part of the project identification and selection task 214, the business development module 208 can be used to send notifications, such as by electronic mail, of the prospective project to appropriate managers within the enterprise for preliminary approval of the project. The notifications sent to the managers may contain a high-level summary of the prospective project. The notifications received by the managers can include one or more fields that can be selected or filled in the each manager to indicate approval or disapproval, and any comments that the managers wish to provide.

Upon receipt of preliminary approvals (216) of the prospective project, the business development module 208 can proceed to the next task, which is an opportunity evaluation task (218). As part of the opportunity evaluation task 218, more documents can be uploaded to support a more detailed analysis of the prospective project. The documents that can be uploaded include documents provided by a customer regarding the prospective project, documents developed by sales personnel at the enterprise regarding the prospective project, and other documents. Based on the more detailed information available at this stage, another round of approval notifications can be sent to appropriate managers to seek the managers' approval.

Upon approval (220) of the opportunity evaluation (218), the next task that the business development module 208 can be used for performing is a proposal development task (222). Proposal development involves creating detailed proposals, including scheduling, fees, and other information, to present to customers. Upon approval (224) of the proposal development by the enterprise and by the customer, final contract negotiation (226) can be performed. Upon execution (228) of the contract, the enterprise is ready to proceed with the project.

As shown in FIG. 2, the tasks 214-228 are performed by a "pursuit team," made up of personnel (e.g., sales personnel) in the enterprise whose responsibilities are to pursue new opportunities for the enterprise. Once the contract is executed, a project execution team is involved in executing the object, represented as tasks 230-250. Note that the project execution team can also be involved in contract negotiations and final approval of the contract (226, 228). The pursuit team can also be involved in the transition (230) from business development to business execution.

The first task performed in project execution is transition/initiation (230) of the project, in which the scope of the project is identified based on the signed contract, and appropriate personnel are allocated to execute the project. Once the core team is determined to be in place (232), planning and engineering (234) can proceed. The project planning and engineering (234) involves developing a project plan, which is subject to approval (236). Upon approval of the project plan, the project execution team can perform project execution and control (238). For example in a hydrocarbon development project, the project execution team can include survey personnel to perform survey activities in the field to identify whether hydrocarbon-containing reservoirs are contained in a subterranean structure, civil engineering personnel to build roads and other infrastructure, drilling personnel to drill wells, completions personnel to install completions equipment in the wells to enable production of the hydrocarbons, and possibly production personnel to perform the production of hydrocarbons from the wells.

Once the project is completed and the customer has accepted (240) the completed project, project closeout (242) can be performed, and various files describing the project, as well as other documents describing lessons learned, can be stored (at 250) for later access for application to future projects.

The project execution is managed using the project management desktop module 206, which presents various views for use by various personnel of the enterprise. The project management desktop module 206 is integrated with the business development module 208 to allow information created during the business development process to be ported to the project management desktop module 206. It is noted that the integration of the business development module 208 and the project management desktop module 206 allows for the business development module 208 to have access to information available to the project management desktop module 206.

A project manager using the project management desktop module 206 can import project scope information, such as information contained in the corresponding project, and other information relating to the duration of the project and scope of the project.

The business development module 208 and project management desktop module 206 are also integrated with the human resources desktop module 212. The business development module 208 can use information from the human resources desktop module 208 to determine available personnel of the enterprise to support a prospective project. When bidding on various prospective projects, the pursuit team using the business development module 208 needs to understand the human resources that are required for the projects.

For example, if the pursuit team plans to bid on ten projects, with the likelihood of winning the bid for each project at 10%, then the pursuit team needs to plan available personnel for one project (since 10×10%=100%). The business development module 208 is used by the pursuit team to requisition people in advance, such that once a bid for a project is accepted by a customer, the personnel are available for allocation to the project.

The project management desktop module 206 accesses the human resources desktop project 112 to identify the personnel that have been allocated to a particular project.

The AFE module 210 is used for creating, tracking, and management of AFEs (authorization for expenditure). An AFE specifies the costs associated with a project, such as costs associated with subterranean surveying, civil engineering, well drilling, well completion, and well production. The costs associated with various activities of a project include costs of supplies as well as costs of personnel. The AFE module 210 can thus correlate each activity of a project to a related expense. Effectively, the AFE includes planned expense information relating planned activities for a project to corresponding estimated expenses An AFE can also specify revenue, which is based on the contracts entered between the enterprise and customers. Each contract calls for payments to be made by the customers to the enterprise for corresponding projects, which determine the revenue that is to be collected by the enterprise.

When a contract is agreed to between an enterprise and a customer for a project, the AFE module 210 can be used to enter information related to the contract. The AFE module 210 can present a graphical user interface (GUI) that includes various fields and menu control items to allow for a user to enter various information. For example, a drop-down menu can be presented to allow a user to enter information related to the project, such as what supplies are needed for which suppliers, requirements of the contract, revenue expected from the contract, and so forth.

Integration can be provided between the AFE module 210 and the business development module 208. The business development module 208 can obtain desired information from the AFE module 210 to allow for a proposal to be generated and for a contract to be finalized. For example, before the contract can be finalized, information relating to costs associated with supplies and availability of supplies may be needed, which would be obtained by the business development module 208 from the AFE module 210. In the reverse direction, the AFE module 210 can also obtain various business development information from the business development module 208.

The AFE module 210 is also integrated with the project management desktop module 206. The project management desktop module 206 can access the AFE module 210 to retrieve information regarding contracts entered into between the enterprise and customers (to obtain revenue information), as well as between the enterprise and suppliers (to obtain cost information).

Figure 3:
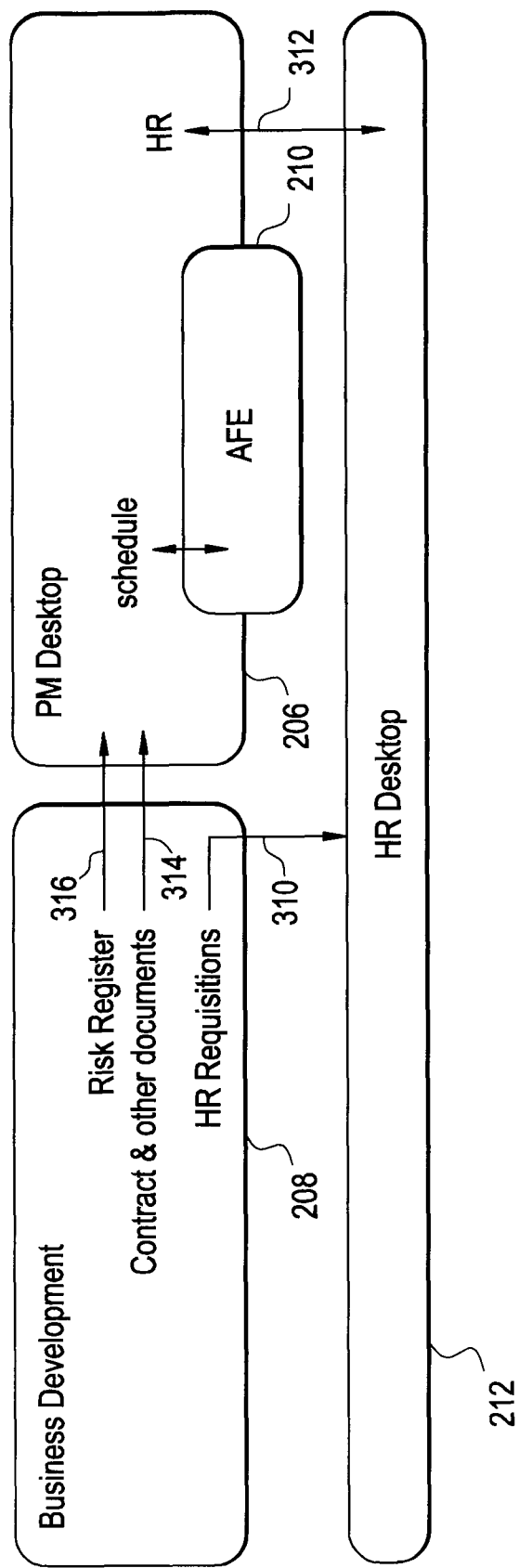
FIG. 3 illustrates interaction between modules of the project planning and management tool of FIG. 2.

FIG. 3 illustrates various information exchanged among the business development module 208, project management desktop module 206, and human resources desktop module 212. The business development module 208 can provide human resources requisitions (310) to the human resources desktop module 212, to request personnel prior to submission of bids for prospective projects. The project management desktop module 206 can also access the human resources desktop module 212 to obtain information (at 312) pertaining to personnel assigned to any particular project.

Contracts and other business development information can be provided (at 314) from the business development module 208 to the project management desktop module 206. Also, the business development module 208 can provide risk information (316) to the project management desktop module 206. The risk information can represent risks in terms of monetary costs. The risk information can be provided in the form of risk registers.

Various activities of a project are associated with risks. For example, there are risks involved in moving a rig from a first well site to a second well site. There can also be risks associated with drilling wells, as well as with building roads, and so forth.

The business development module 208 allows users to enter known risks associated with the activities of a project. This risk information can be provided (316) to the project management desktop module 206 to perform risk assessment, as described further below.

As further depicted in FIG. 3, the project management desktop module 206 and the AFE module 210 can exchange information (318), including schedule information, revenue information, and cost information. The business development module 208 can also access information from the AFE module to obtain information regarding costs of supplies associated with a prospective project, such that the business development module 208 can be used for putting together a proposal and to negotiate a contract for a prospective project.

During performance of the project, the project management desktop module 206 can track deviations from the estimated expenses for corresponding planned activities.

Figure 4:
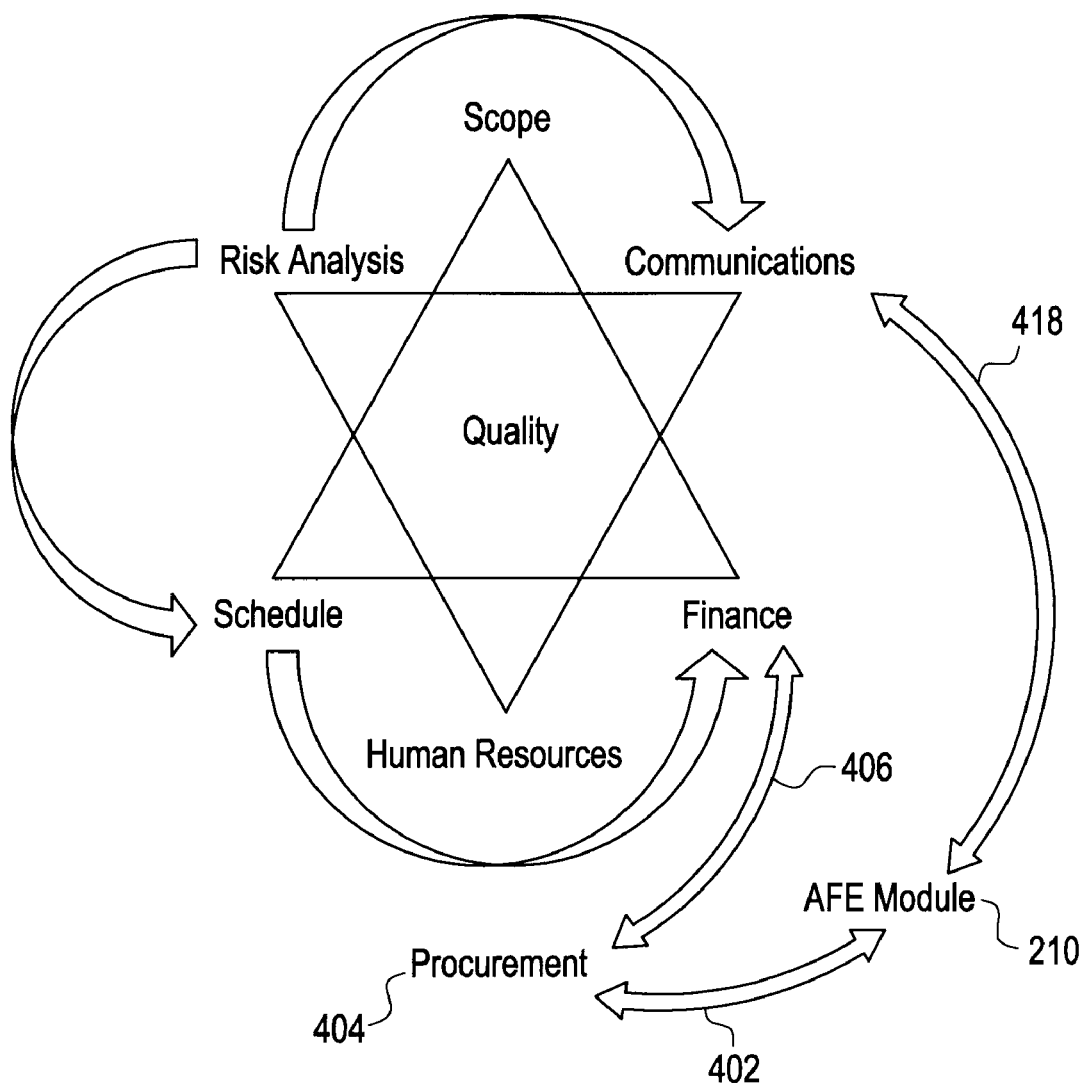
FIG. 4 illustrates various components associated with project planning and management that are integrated according to an embodiment.

As depicted in FIG. 4, in accordance with some embodiments, the project management desktop module 206 is used for integrating various project management components, including scope, risk analysis, schedule, human resources, finance, and communications. "Scope" refers to a definition of the scope of the project, including the expected activities, expected revenue, expected deadlines, and so forth. "Communications" refers to communications among different personnel of the enterprise, as well as between members of the enterprise and third parties, regarding various aspects of the project. In the context of FIGS. 2 and 3, communications include sending information to managers for approval of a prospective project during the project development stage, communications during the project execution stage, and communications among the various modules of the project planning and management tool.

FIG. 4 also shows a "quality" component, which includes various quality criteria and metrics. Activities of the project are performed to meet the quality criteria (e.g., service quality criteria, client acceptance targets, etc.). The quality metrics are used as indicators of quality levels that have been achieved by various activities.

Another component is "risk analysis," which refers to analyzing risks associated with various activities of a project, and identifying points associated with elevated risks.

The "schedule" component refers to information representing the overall schedule of the project, with deadlines specified for various functions and activities associated with the project. The "human resources" component refers to the allocation of personnel of the enterprise to the project. The "finance" component refers to the monetary aspects of the project, including revenue (planned and actual) and costs (planned and actual).

In accordance with some embodiments, a link 402 is provided between a procurement subsystem 404 and the AFE module 210. To enable the procurement subsystem 404 to submit purchase orders for needed supplies, the AFE module 210 sends information regarding required supplies to the procurement subsystem 404. The AFE module 210 informs the procurement subsystem 404 how many of each supply item is needed. In one implementation, the information submitted by the AFE module 210 can be in the form of a shopping cart, for example, where the shopping cart specifies the supplies needed for a particular project. In response to the shopping cart, the procurement subsystem 404 can submit purchase orders to third party suppliers. The procurement subsystem 404 can send purchase order numbers back to the AFE module 210 to be able to track the ordered supply items and account for such items when they are delivered to work sites.

A link 406 is provided between the procurement subsystem 404 and the "finance" component. The procurement subsystem 404 can forward the purchase orders to the "finance" component to allow finance to keep track of costs involved in obtaining supplies for a project.

Suppliers can submit invoices to finance. The invoices are checked by finance against financial system records.

The AFE module 210 can provide information contained in the AFE module 210 to the project management desktop module 206 over link 408. Examples of information sent from the AFE module 210 to the project management desktop module 206 are described above.

The AFE module 210 is also linked to the schedule component so that a time-based tracking of AFE can be performed. As noted above, during performance of the project, the project management desktop module 206 can track deviations from the estimated expenses for corresponding planned activities.

The risk analysis component of the project management desktop module 206 embeds risks with associated activities of a project. By embedding the risks with the activities, the project management desktop module 206 is able to identify when risks are likely to occur based on the schedule of the activities. Moreover, the project management desktop module 206 can identify time intervals during which there may be elevated risks due to several activities with high risks occurring close to each other in time. For example, on a certain day, there may be multiple rig moves, where rigs are moved from one well site to another well site. Moving multiple rigs on the same day may be associated with a higher risk than if just one rig was moved on the certain day. Identification of time intervals of elevated risks can allow a project manager to plan for sufficient personnel to handle the elevated risk, or alternatively, the project manager can reschedule certain activities to more evenly distribute risk over time.

Project plan templates can be defined by the project management desktop manager 206. The project plan templates contain predefined risks associated with corresponding activities. The project plan templates are accessed to associate risks with activities when a project plan is created. The risks are scheduled according to the schedule of the activities in the project plan.

As the project plan is updated, the scheduled occurrence date for each risk can also change automatically. For example, if a particular activity is delayed, then the expected occurrence of the associated risk is also delayed. The project management desktop module 206 can present various views to show the risk profile of activities in a project.

Another feature provided by the project management desktop module 206 is the provision of various views of the project. One view can be an high-level view of the overall project, which can be used by upper-level management. The high-level view can indicate whether or not the project is ahead of schedule or behind schedule, and whether or not the project is over budget or under budget. If the high-level view provides an indication that the project is over budget and/or behind schedule, then the project management desktop module 206 can be used to drill deeper into the data maintained by the project management desktop module to identify causes of the project being over budget and/or behind schedule.

Figure 5:
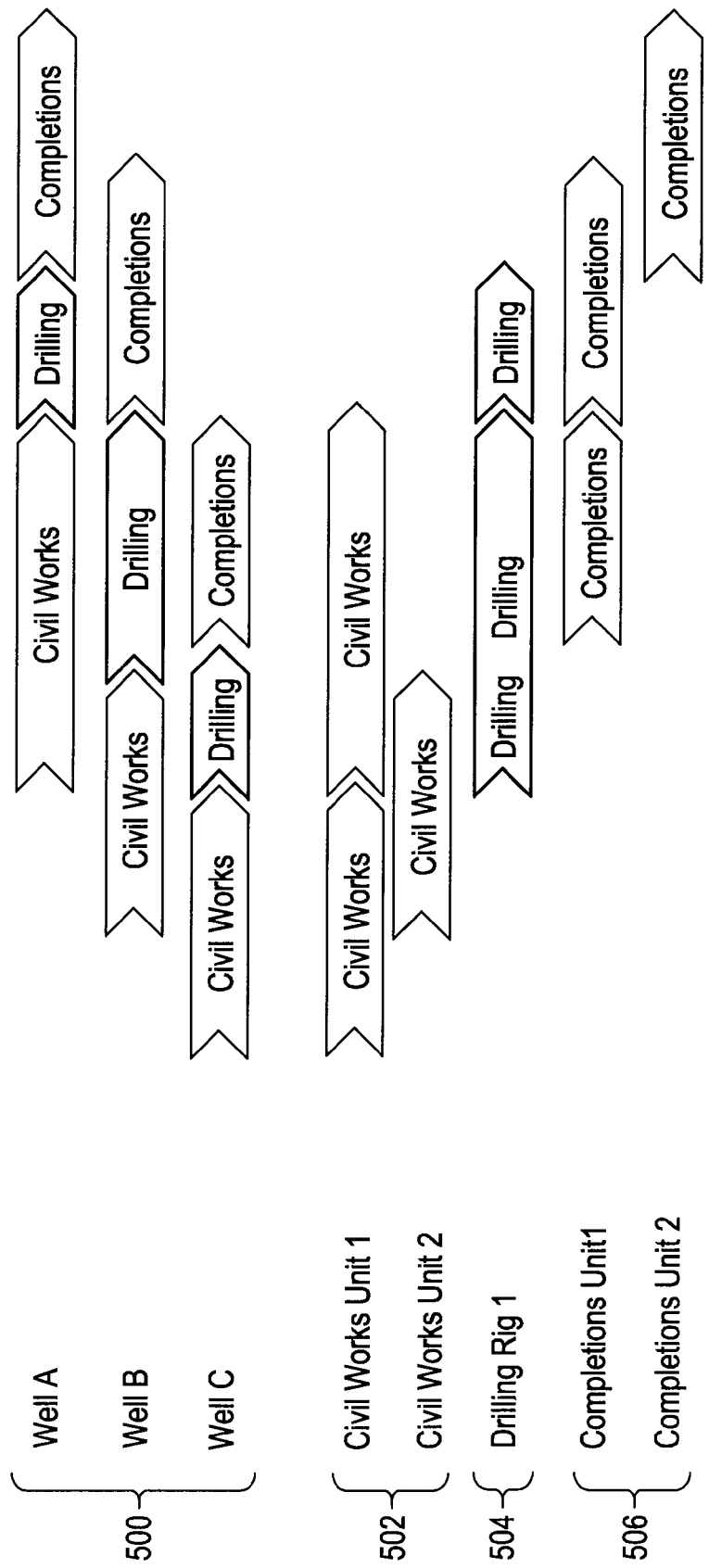
FIG. 5 illustrates various line-of-sight (LOS) views generated by the project planning and management tool according to an embodiment.

FIG. 5 illustrates various line-of-site (LOS) views. A first LOS view 500 depicts general functions for three corresponding wells: well A, well B, and well C. For each well, various general functions are depicted, including a civil works function, a drilling function, and a completions function. The LOS view 500 is intended to present a time-based view of the functions associated with each well. Thus, in FIG. 5, the arrow representing the civil works function for each of the wells is intended to show the time extent of the civil works function for each well. Thus, as can be seen, there is some overlap of the civil works functions associated with wells A-C. As a result, at least two civil works units would be needed to perform civil works functions for the three wells, since there is time overlap of the civil works functions. The LOS view 500 can be considered a well-based LOS view of the project, to be used by a project manager to see what is planned for various wells that the project manager is overseeing.

An LOS view 502 (civil engineering LOS view) is presented to depict civil works functions for each of the two civil works unit. The LOS view 502 indicates that civil works functions for well C and well A are to be performed by civil works unit 1, whereas the civil works function for well B is to be performed by civil works unit 2.

The LOS view 500 also depicts drilling functions to be performed for wells A, B, and C. Note that there is no overlap of the drilling functions for the three wells, so that one drilling rig can be used to perform the three drilling functions, as depicted in the LOS view 504 (a rig-based LOS view).

The LOS view 500 shows that the completions functions of the three wells overlap, so that two completions units would have to be used to perform such completions functions. For example, in LOS view 506 (completions-based LOS view), the completion functions for well C and well A are performed by completions unit 1, and the completions function for well A is performed by completions unit 2.

The different LOS views can be presented to different users based on their roles in the enterprise. For example, a project manager may be presented with the LOS view 500, a civil works employee may be presented with the LOS view 502, a drilling rig employee may be presented with the LOS view 504, and a completions employee may be presented with the LOS view 506. The project management desktop module 206 can automatically detect the role of the user (based on user identifier information) and present the corresponding LOS view.

In addition to role-based LOS views, other types of LOS views can be provided, such as LOS views based on the resource of interest to a user, LOS views based on activities of interest to a user, LOS views based on levels of the users within an enterprise, LOS views based on types of suppliers to the enterprise, and so forth.

Figure 6:
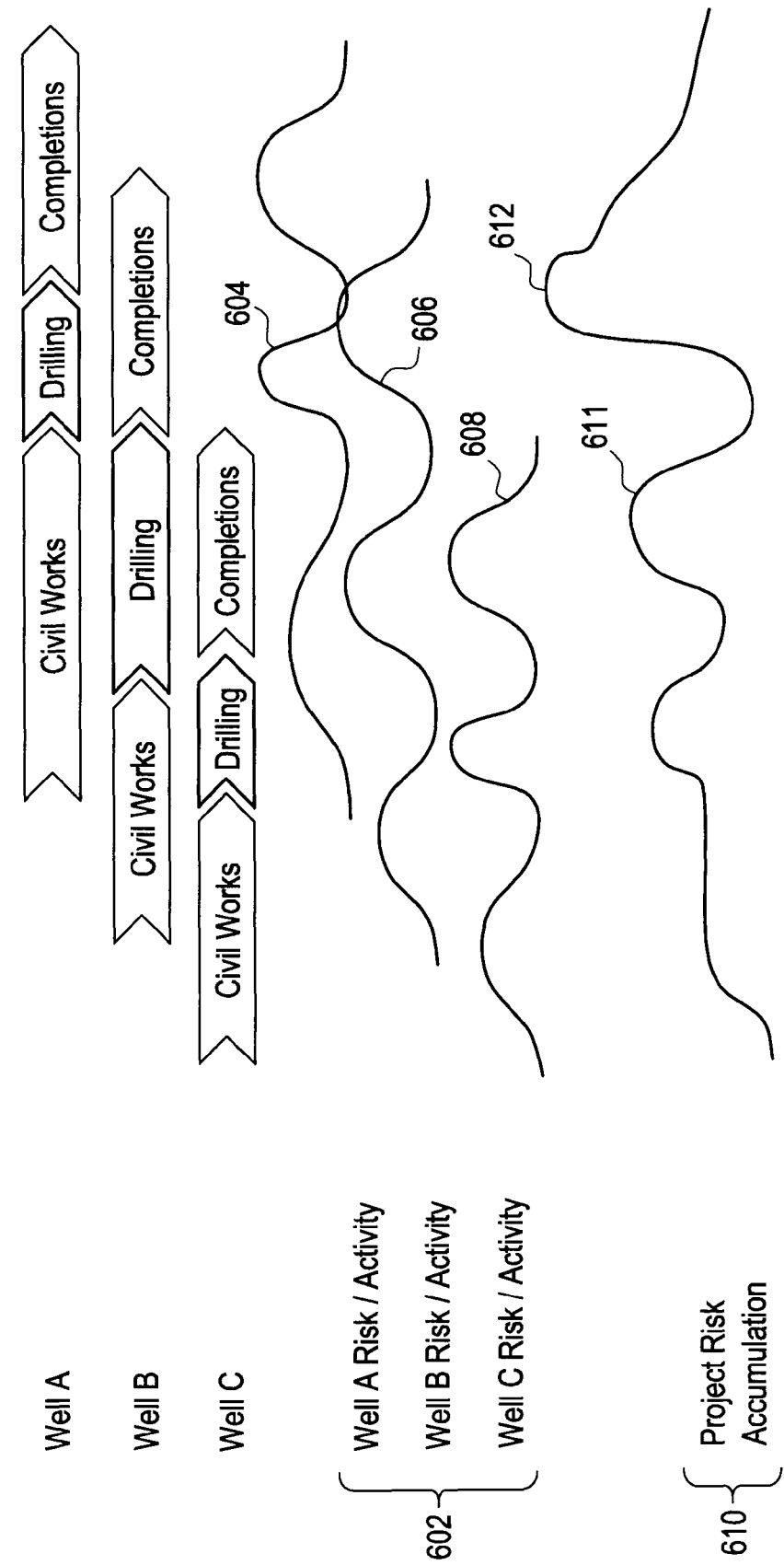
FIG. 6 illustrates views of risks associated with various activities of a project generated by the project planning and management tool according to an embodiment.

FIG. 6 shows risks associated with the various activities for wells A, B, and C. A risk-based view 602 includes graphs 604, 606, and 608 that are representative of risks associated with activities (activities associated with each of the civil works drilling, and completions functions) for wells A, B, and C, respectively. Each curve 604, 606, or 608 varies between low risk values and high risk values over time. A high risk value indicates an elevated risk at the corresponding time point, whereas a low risk value indicates reduced risk at the corresponding time point.

Another view 610 in FIG. 6 depicts a curve 611 that represents accumulated risk over time, which is based on aggregation of the risks represented by curves 604, 606, and 608. In the example of FIG. 6, there is a time interval 612 of elevated accumulated risk (risk in time interval 612 is greater than risk at any other time point in FIG. 6). A manager who sees such elevated risk can either plan for increased personnel to handle the risk, or to reschedule certain events to reduce the magnitude of the risk.

Alerts can be automatically generated in response to detection of elevated risks by the project management desktop module 206.

Instead of presenting the risks in curves as depicted in FIG. 6, other manners of presenting risks can be performed. For example, a histogram of risks can be presented, such as the level of risk by well.

The project management desktop module 206 also enables comprehensive operational performance tracking. In some embodiments, an earned value approach is used. "Earned value" refers to the value of the work completed to date. The earned value can differ from the planned value (value according to a planned schedule). Tracking the difference between the earned value and planned value can provide valuable metrics regarding the progress of the project.

By using the integrated project planning and management tool according to some embodiments, more efficient and comprehensive project planning and management can be performed. Project planning and management does not have to depend upon experience of individuals, since the tool provides standardization to allow consistent usage. Reports can be automatically generated ease the amount of time that has to be spent producing reports. Integration of various project planning and management components can result in reduced errors and inconsistencies.

Instructions of software described above (including modules 206, 208, 210, and 212 of FIG. 2) are loaded for execution on a processor (such as one or more CPUs 202 in FIG. 2. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method executed by a computer for project planning and management, comprising:
   receiving planned expense information relating planned activities to corresponding estimated expenses for a well project that comprises drilling activities to drill wells at different sites using moveable drilling equipment;
   during performance of the project, tracking deviations from the estimated expenses for corresponding planned activities;
   receiving risk information identifying risks associated with the activities of the project for each of the wells, wherein the risk information specifies expected monetary costs of the respective risks;
   based on the risk information and use of the moveable drilling equipment for the drilling activities at the different sites, performing calculations using the computer to offset risks for the wells with respect to time and to aggregate the risks for the wells as an accumulated risk associated with plural activities for the wells, and presenting a view to a display indicating the risk as a function of time for each of the wells and the accumulated risk for the wells;
   responsive to identification of a time interval where the accumulated risk for the wells meets or exceeds a high risk value, planning for procurement of resources to handle the accumulated risk or rescheduling one or more planned activities to redistribute one or more risks of the accumulated risk over time; and
   based on the planning or rescheduling, updating the planned expense information relating planned activities to corresponding estimated expenses for the well project and presenting an updated view to the display.

2. The method of claim 1, further comprising linking the planned expense information to a schedule to provide time-based tracking of the estimated expenses for the planned activities.

3. The method of claim 1, wherein receiving the planned expense information comprises receiving authorization for expenditure (AFE) information.

4. The method of claim 1, further comprising:
   presenting a view to provide an indication of whether the project is under or over budget and whether the project is meeting a planned schedule.

5. The method of claim 1, wherein the receiving and tracking are performed by a tool executable in the computer, the method further comprising:
   the tool enabling business development of a prospective project.

6. The method of claim 5, further comprising:
   using the tool to send notifications to target managers in an enterprise to seek approval of the prospective project.

7. The method of claim 6, further comprising:
   using the tool to develop a proposal for the prospective project; and
   using the tool to create a contract between an enterprise and a customer.

8. The method of claim 7, further comprising:
   using the contract to determine a revenue for the prospective project.

9. The method of claim 1, further comprising:
   presenting different line-of-sight (LOS) views of information relating to the project, wherein the different LOS views provide different information for different types of users.

10. The method of claim 9, wherein the different LOS views are provided according to any one or more of the following: roles of the users, levels of the users within an enterprise, types of suppliers to the enterprise, types of resources of interest, and types of activities of interest.

11. The method of claim 1, further comprising:
    tracking occurrence of any of the risks during performance of the project.

12. The method of claim 11, further comprising:
    based on the tracking, determining whether costs associated with the risks have been over-estimated or under-estimated.

13. The method of claim 1, wherein the receiving and tracking are performed by a tool executable in the computer, the method further comprising:
    the tool integrating plural components of project planning and management, wherein the components include scope, communications, risk analysis, schedule, human resources, finance, and quality.

14. The method of claim 13, further comprising integrating a procurement subsystem with the tool, wherein the procurement subsystem is used for ordering supplies for the project.

15. The method of claim 14, further comprising:
    the tool sending information to the procurement subsystem to cause the procurement subsystem to order supplies.

16. The method of claim 1 wherein the plural activities for the wells comprise at least one member selected from a group consisting of civil works activities, drilling activities and completions activities.

17. The method of claim 1 wherein the presenting the view further comprises illustrating activities for each of the wells.

* * * * *